United States Patent [19]
Finney et al.

[11] Patent Number: 5,702,161
[45] Date of Patent: Dec. 30, 1997

[54] MACHINE FOR REMOVAL OF MATERIALS FROM A SURFACE

[76] Inventors: Randal D. Finney, 7700 Hillview Ct., Tracy, Calif. 95378; Robert D. Adamson, 351 Ewing Dr., Pleasanton, Calif. 94566

[21] Appl. No.: 570,725

[22] Filed: Dec. 11, 1995

[51] Int. Cl.⁶ .............................. B32B 31/18; E21C 47/00
[52] U.S. Cl. ............................. 299/37.1; 15/93.1; 30/170
[58] Field of Search ........................... 299/12, 36.1, 37.1; 15/93.1; 30/170

[56] References Cited

U.S. PATENT DOCUMENTS

| | | | |
|---|---|---|---|
| 2,693,950 | 11/1954 | Calder | 299/12 X |
| 2,864,104 | 12/1958 | Le Sage | 15/93.1 |
| 2,874,946 | 2/1959 | Singleterry et al. | 299/37.1 |
| 3,917,350 | 11/1975 | Bricher | 30/170 X |
| 5,037,160 | 8/1991 | Ukai | 299/37.1 |
| 5,197,784 | 3/1993 | Holder | 299/37.1 |

OTHER PUBLICATIONS

Terminator Services, Inc., Brochure for "The Terminator," date unknown.

Innovatech Products & Equipment, Brochure for "The Terminator," 1994.

*Primary Examiner*—David J. Bagnell
*Attorney, Agent, or Firm*—Flehr Hohbach Test Albritton & Herbert LLP

[57] ABSTRACT

A machine for removing a material mounted to an underlying surface from the underlying surface is disclosed. The machine includes a frame body, an assembly for propelling the frame body relative to the surface, a plate carried by the frame body and a blade assembly pivotally coupled to the plate. The plate is movable relative to the frame body between a deployed position for removal of the material from the surface and a stored position with the plate positioned for unrestricted movement of the frame body relative to the surface. The blade assembly includes a removal blade for removing the material from the surface. The blade assembly is movable between a plurality of positions with the blade oriented at an angle relative to the plate, and is secured in a selected one of the plurality of positions during removal of the material from the surface. The machine also includes at least one blade actuator for moving the blade assembly relative to the plate and at least one plate actuator for moving the plate relative to the frame body.

24 Claims, 5 Drawing Sheets

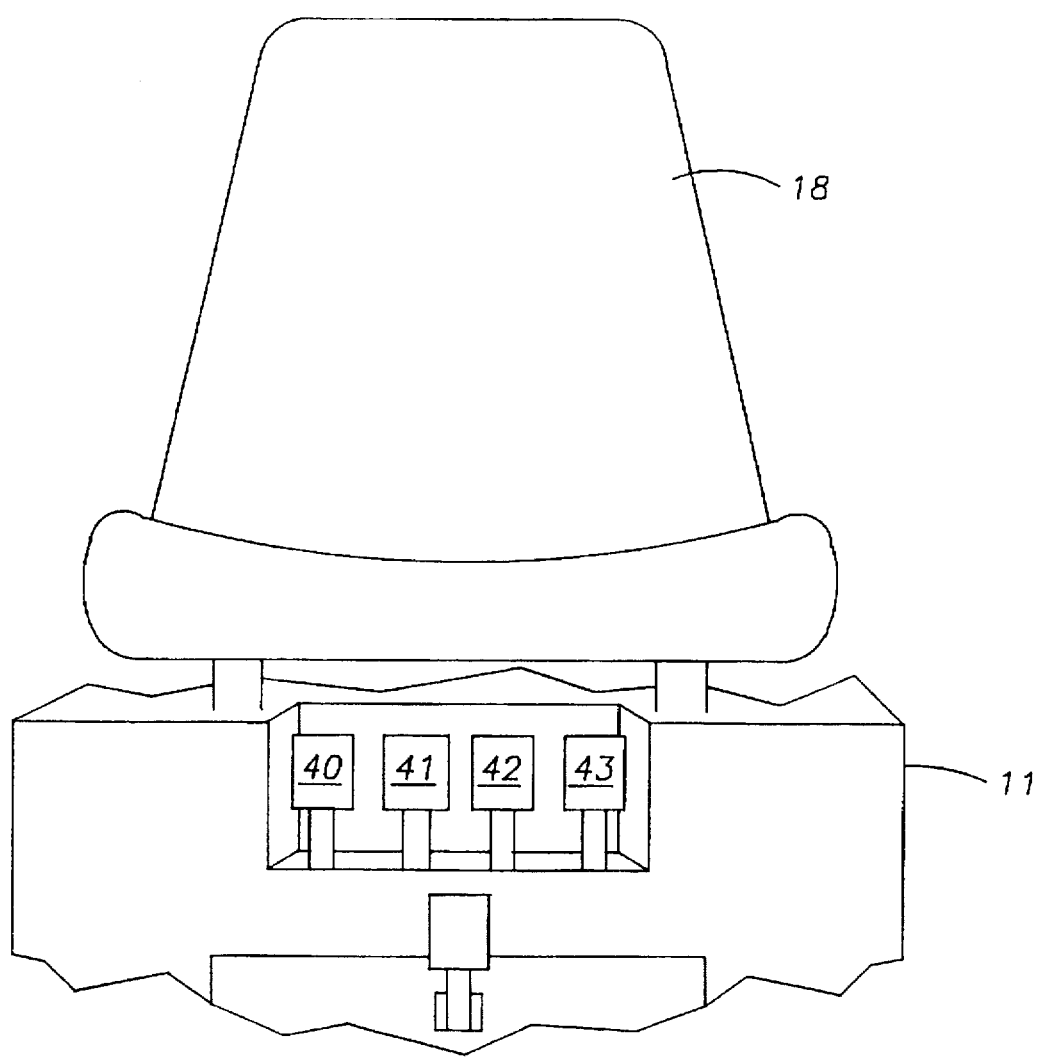
FIG.—7
FIG.—8

MACHINE FOR REMOVAL OF MATERIALS FROM A SURFACE

This invention relates to a machine for removing materials from a floor, roof or other surface where the materials are generally laid over and adhered to the surface.

BACKGROUND OF THE INVENTION

It is necessary from time to time to remove materials from floors, roofs and other surfaces. Examples of such materials include linoleum, vinyl, rubber, urethane, epoxy and other plastics, and asbestos or asbestos-containing building materials for flooring. Other materials include roofing and waterproofing materials, wood, ceramics and adhesive.

The removal of the material may be accomplished by hand-using hand-held blades, but such means of removal is expensive and difficult, and requires considerable effort on the part of the humans employed for the purpose. The considerable time required to remove the materials is of particular disadvantage when the material is removed from a store or other place of business, often requiring the business to remain closed during the process. In some circumstances, it may even be physically impossible to remove the materials by hand.

Machines are available for this purpose, but they have disadvantages. For example, many of the available machines do not offer sufficient power or speed to remove the more difficult materials from the surface. Some machines offer minimal or limited flexibility in the available angles of the removal blade. Such machines often require that the angle of the removal blade be adjusted manually, forcing the user to disembark from the machine to adjust the blade angle. One type of available machine uses many fork-lift parts, thereby increasing the expense, complexity and maintenance costs of the machine.

OBJECTS OF THE INVENTION

It is an object of the invention to provide a machine which will efficiently remove materials from a floor, roof or other surface.

It is a further object to provide such a machine which is flexible, in that it may be readily adjusted to accommodate materials of different types and in different situations.

The above and other objects of the invention will be apparent from the ensuing description of the appended claims.

BRIEF DESCRIPTION OF THE DRAWINGS

FIG. 7 is a fragmentary view as seen from the front showing the operator's seat and the control handles; and FIG. 8 is a front end view of another blade which may be used with the machine.

SUMMARY OF THE INVENTION

Mounted on a wheeled, steerable tractor frame is a plate mounted at the forward end of the tractor for movement upwards and downwards and at different angles, and equipped with a blade which penetrates beneath the material and the underlying surface, and accomplishes the separation or ripping of the material from the underlying surface. The aforesaid plate is mounted so that it can be moved between different positions, and at its forward end it is provided with an angular knife-like blade which can be tilted to different angles and which penetrates between the material and the surface. Controls are provided to manipulate the machine itself, steering it one way or the other as needed, putting it into reverse when needed and providing greater or lesser power according to circumstances.

DETAILED DESCRIPTION OF THE PREFERRED EMBODIMENTS

Figure 1:
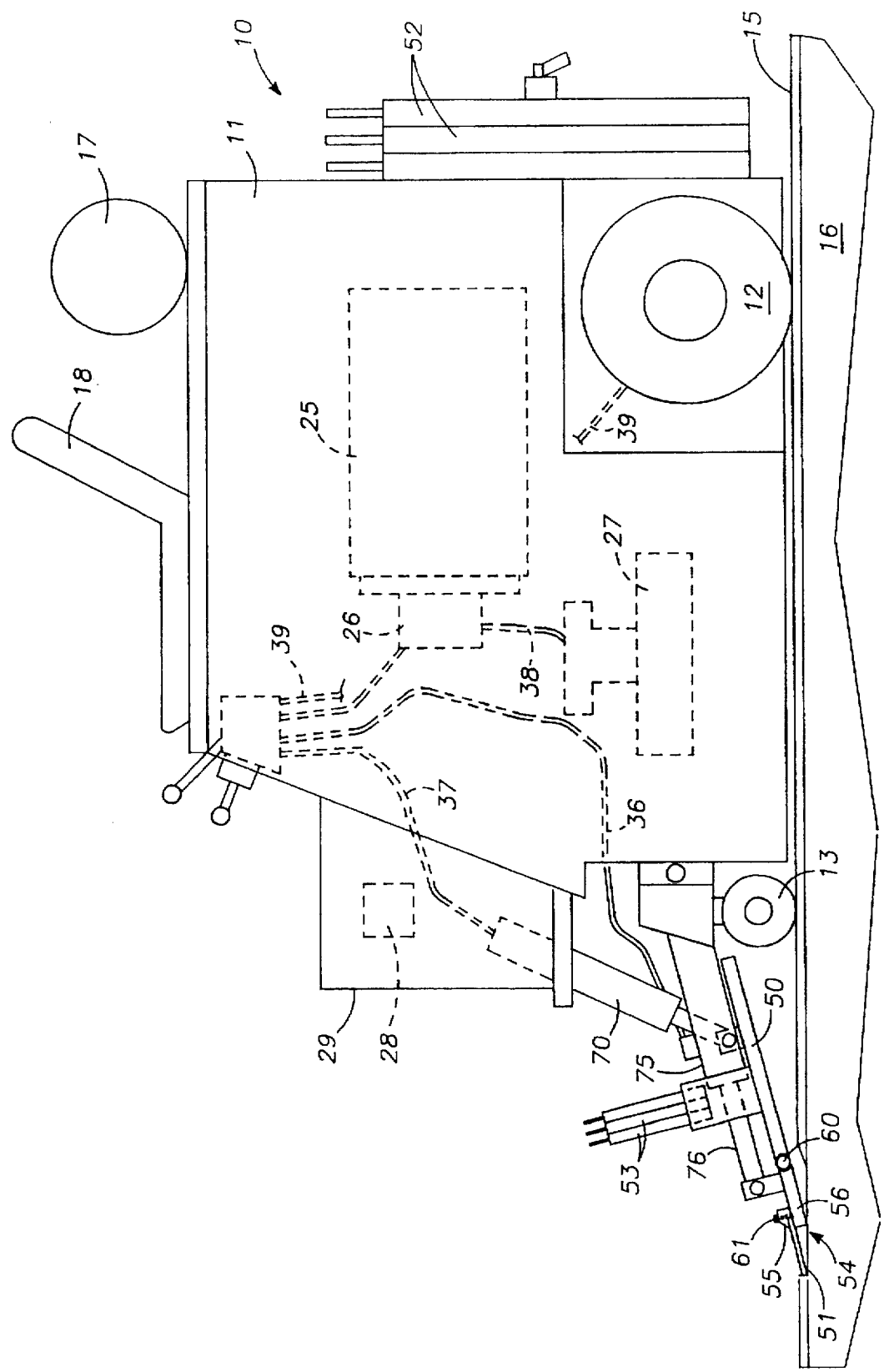
FIG. 1 is a view in side elevation of the machine of the invention.

Referring now to FIG. 1, the machine is designated generally by the reference numeral 10. It comprises a body 11 mounted on rear wheels 12 and front wheels 13, the latter being pivotally mounted. In the illustrated embodiment, the machine is shown tipping a covering 15 from a flooring 16. However, it is to be understood that the machine 10 may also be used to remove materials from a roof or other surface. A fuel tank 17 is shown as is a seat 18 at the front end of the tractor for a human operator. A motor 25 is provided which supplies the power to operate the machine, including an hydraulic pump 26 and a filter and cooler 27 for the hydraulic fluid. The fuel tank 17 and motor 25 may be configured for propane, diesel or gasoline, depending upon the application. If the machine 10 is to be used indoors to remove materials from a floor, a propane tank and propane altered engine are preferably employed. If desired, the machine 10 may also be battery or electrically operated. As is shown in FIG. 1, the pump 26 is located to the front of the motor 25. The motor 25 is mounted in a backward orientation relative to the body 11, with the pump 26 being driven by the fly wheel (not shown) of the motor. In this embodiment, the battery 28 is positioned within an enclosure 29 on the front of the vehicle, providing convenient access to the battery for maintenance and/or replacement. Gauges and the like (not shown) are provided on the upper surface of the enclosure 29. Also shown are lines 35, 36, 37 and 38 for flow of hydraulic fluid. A hydrostatic motor (not shown) is associated with each rear wheel 12, with line 39 and an additional line (not shown) providing for the flow of hydraulic fluid to the hydrostatic motor. The hydrostatic motors are used for steering the machine 10, and are similar to those employed in tractor technology for this purpose.

With the exception noted above, the elements of the machine thus far described are standard and known, being commonly used in various industrial applications. The overall design of the body 11 and position of the rear wheels 12 and front wheels 13 is subject to considerable variation.

Referring now to FIG. 7, hand-operated controls 40, 41, 42 and 43 are shown which are manipulated by an operator sitting in the seat 18. In the illustrated embodiment, the hydrostatic controls are used. However, other types of controls may be used if desired.

Control 40 controls the hydrostatic motor associated with the right rear wheel 12 (which is not shown in FIG. 1) and control 43 controls the hydrostatic motor associated with the left-hand rear wheel 12 which is shown in FIG. 1. By means of these controls the respective rear wheels can be independently accelerated, decelerated or driven in reverse to steer the vehicle. For example, a right turn may be achieved by increasing the speed of the left rear wheel relative to the right rear wheel. Depending upon the desired turn radius, the right wheel may be decelerated, stopped, or shifted into reverse during the turn using control 40. During this time, control 43 is preferably used to increase the speed of the left rear wheel 12, although if desired the speed of the left wheel remain unchanged with the speed of the right wheel being adjusted to accomplish the turn. The machine may be turned to the left by increasing the speed of the right wheel relative to the left.

Control 41 operates to lift and lower the plate 50 (see FIG. 1) and control 42 controls the blade 51 (see also FIG. 1). As shown in FIG. 1, weights 52 are mounted on the rear of the machine which can be added to or removed. The purpose of these weights is to restrain upward tilting of the rear of the machine in response to force exerted at the front end of the machine by flooring or other material which is difficult to remove. Weights 53 are provided at the front end of the machine, such weights being removable to increase or diminish the total weight. The purpose of the weights 53 is to apply a downward force to the front portion of the machine 10, increasing the pressure applied to the blade during the removal process. Increasing or decreasing the total weight provided by weights 53 ensures the desired amount of pressure will be applied for a particular application, with more weight being needed for materials which are difficult to remove.

The blade 51 is carried by a blade support 54 which is pivotally coupled to the plate 50 at 60 so as to be tiltable in relation to the plate 50 as shown in FIGS. 2 to 5. In this embodiment, the blade support 54 includes an upper member 55 which is secured to a lower member 56 by a plurality of bolts 61 to compress the blade between the members 55 and 56. However, it is to be understood that the configuration of the blade support 54 and the manner in which the blade 51 is mounted to the support 54 may be modified within the scope of this invention. Blades 51 of different widths, lengths and shapes can be mounted and can be removed for repair or for replacement by longer or shorter knife edges. For example, FIG. 8 shows a bowed or dicing blade 51a which may be used to form furrows by removing a section of material. These furrows provide a gap which may be used to slip the blade 51 between the material and the underlying surface, with the machine operating to remove the material in a direction perpendicular to the longitudinal axis of the furrow.

Figure 6:
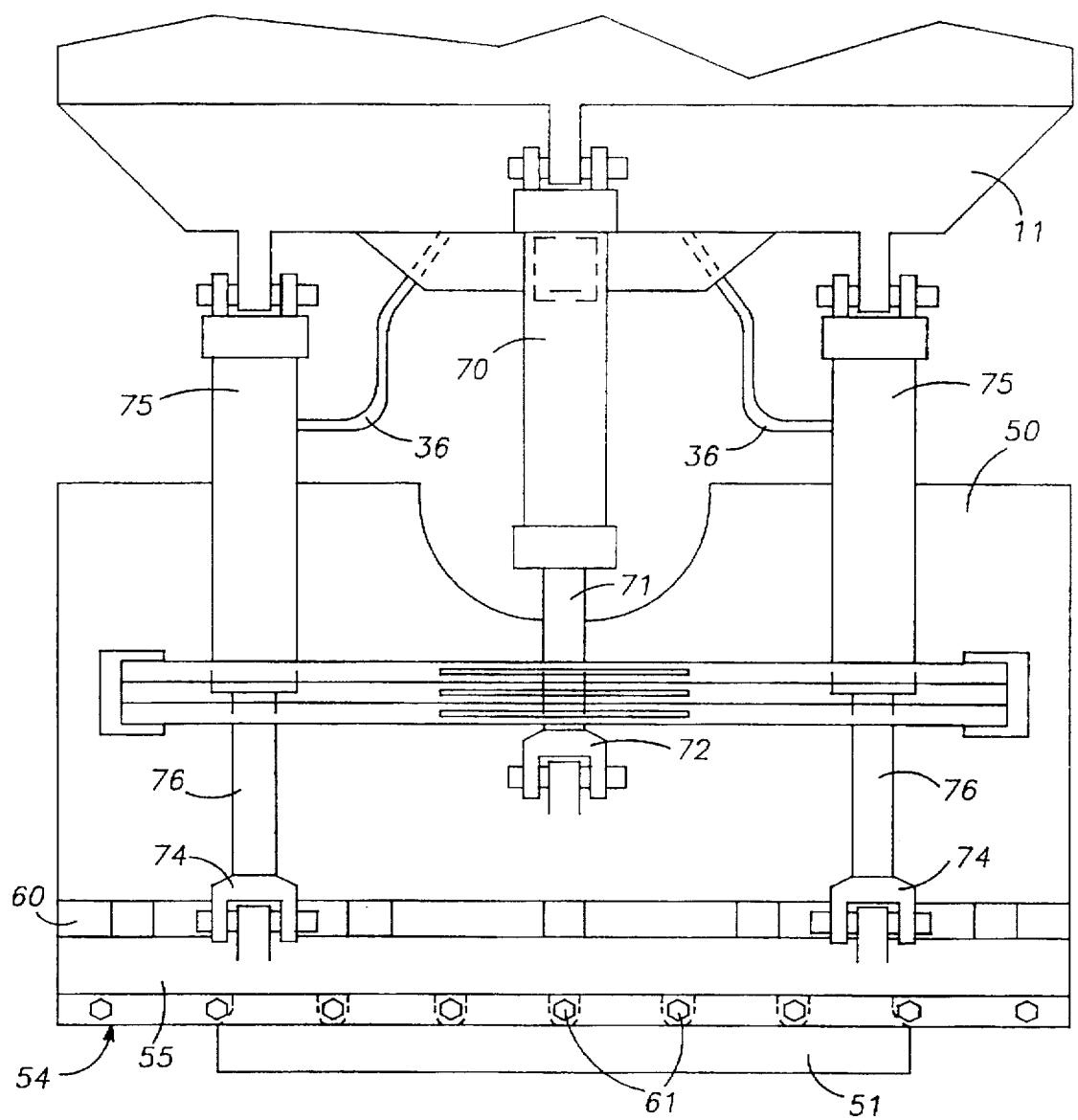
FIG. 6 is a fragmentary view from the top of the machine.

Referring to FIG. 6, the plate 50 is pivotally mounted on the frame of the machine 10 by a hydraulic cylinder 70 connected to the plate by a rod 71 and coupling 72. The blade 51 may be manipulated by using hydraulic cylinders 75 which are carried by the frame body 11 and coupled to the blade support 54 by rods 76 and couplings 74. The cylinders 70 and 75 are coupled to the controls 41 and 42 (FIG. 7), respectively, by hydraulic lines 37 and 36. Control 41 may be used to move the plate 50 to the desired elevation relative to the machine 10. The angle of the blade support 54, and therefore the blade 51, relative to the plate 50 may be adjusted using control 42. Thus, the position and orientation of the blade 51 and plate 50 may be automatically adjusted without requiring the user to step down from the machine and manually adjust the components. For example, if the machine 10 encounters a section of material which is particularly difficult to remove, the user may stop the machine 10 and pivot the blade 51 in a downward direction relative to the plate 50. Thus, the machine 10 is of particular advantage in that it significantly increases the user's convenience and efficiency. Although the machine 10 is generally stopped prior to adjusting the blade 51 and plate 50, it is to be understood that there may be an application within the scope of this invention in which it is desirable to manipulate the blade 51 and/or plate 50 when during operation of the machine 10.

Figure 2:
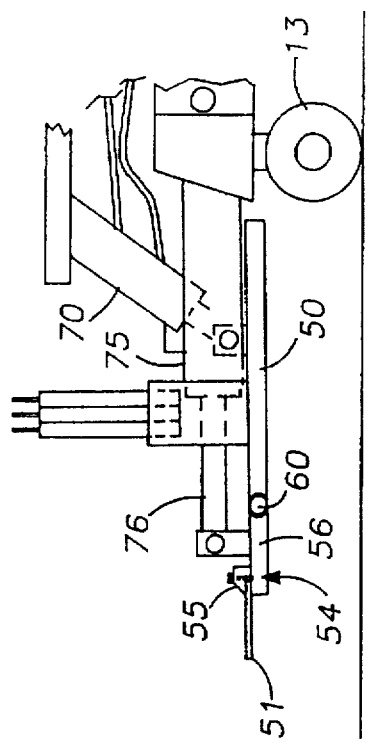
FIGS. 2–5 are views of the machine of FIG. 1 showing how the plate and blade thereof are manipulated.
Figure 3:
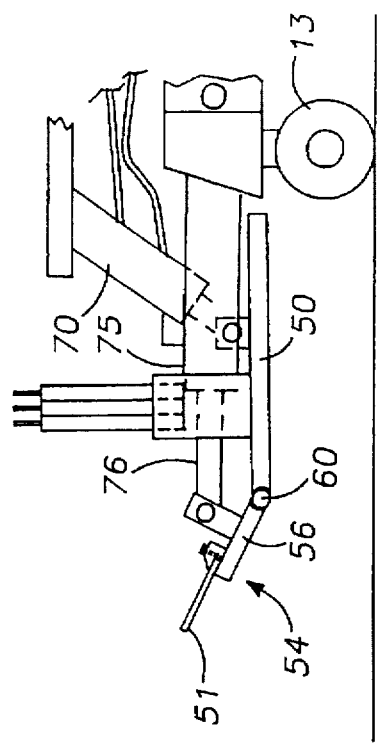
Figure 4:
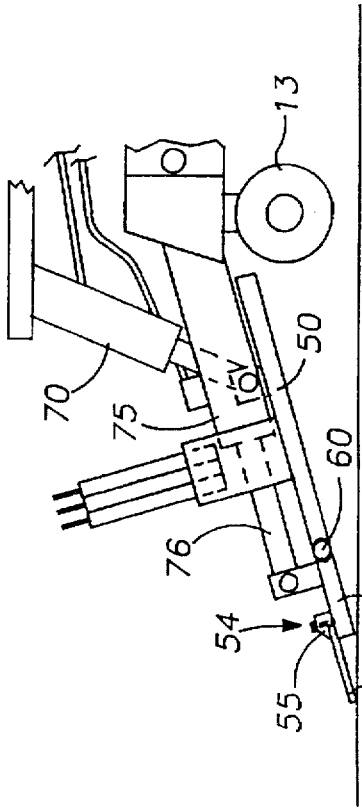
Figure 5:
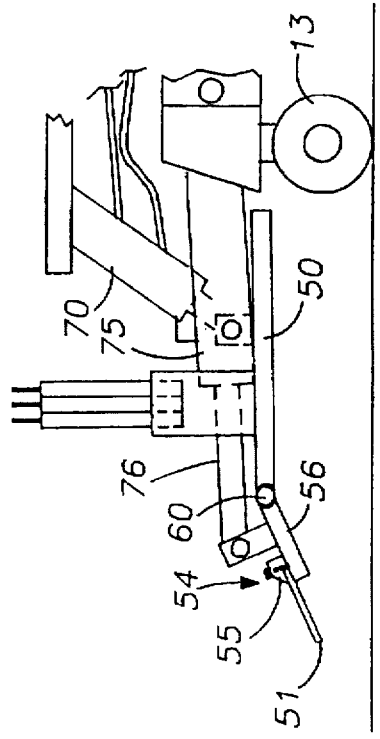

FIGS. 2–5 illustrate examples of the relative positioning of the plate 50 and blade support 54. In FIG. 2, the blade 51 and plate 50 are shown in the conventional working position which is also shown in FIG. 1. The front wheels 13 are elevated from the flooring 16 or other surface, with pressure being applied entirely to the blade 51. In FIG. 3, the blade support 54 and plate 50 are raised to allow the machine 10 to be conveniently driven to another location. FIGS. 4 and 5 show the blade support 54 oriented at other angles relative to the plate 50. The orientation in FIG. 5 may be useful when it is necessary to change the blade 51. The relative positions of the plate 50 and blade 51 are not to be limited to those shown in the Figures. Instead, it is to be understood that the blade may be conveniently adjusted to the desired angle and position using controls 41 and 42.

Figure 9:
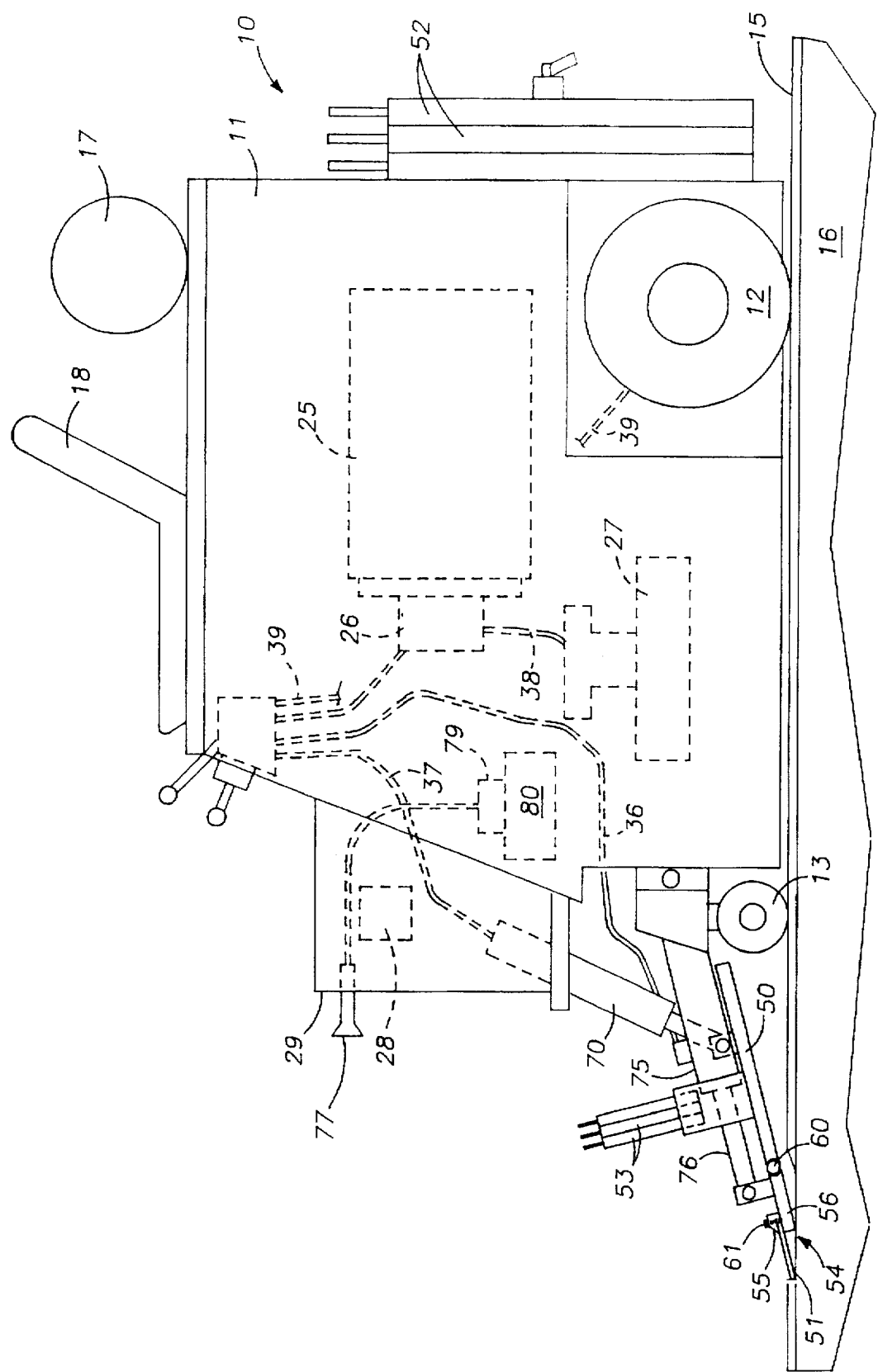
FIG. 9 is a view in side elevation of a machine in accordance with another embodiment of the invention.

FIG. 9 shows an embodiment of a material removal machine 10 which is particularly suitable for use in the removal of asbestos and asbestos-containing-materials. Removing asbestos or asbestos-containing-materials after dampening the material is recommended as it is considered to be safer than removing the dry material from the floor, roof or other surface. One option is to have an individual walk across the surface with a hose and spray the material prior operation of the machine. However, this method is inconvenient in that unless the material is fully saturated, the material may dry before it is actually removed by the machine. Spraying the material during operation of the machine is also undesirable because it requires the use of a second individual and may places this individual in close contact with the asbestos or asbestos-containing-material. Machine 10 includes a misting system which may be used to automatically dampen or wet the material during operation of the machine. With the misting system of this invention, the material which is removed from the surface will consistently have the optimum moisture content. As is shown in FIG. 9, in the illustrated embodiment the machine 10 includes a nozzle 77 mounted to the front of the machine coupled via fluid line 78 to a pump 79 and a storage tank 80. In the illustrated modification, a four head misting spray nozzle is employed, although it is to be understood that the configuration of nozzle 77 is subject to considerable variation. The nozzle 77 is preferably adjustable so that it may be easily manipulated to spray the fluid in the desired direction. The nozzle 77 is also preferably detachable so that it may be removed from the machine when it is not in use. The tank 80 retains a supply of fluid, usually water, which may be used to safely dampen the material during the removal process. It is to be understood that the actual configuration of the misting system is not to be limited to the configuration shown in FIG. 9, but is instead subject to considerable variation within the scope of this invention.

It will therefore be apparent that a new and useful machine has been provided for the purpose of removing materials from floors, roofs or other surfaces. The machine may be used to rapidly and efficiently remove materials such as floor coverings, rubber, vinyl, urethane, epoxy and other plastics, asbestos and asbestos containing building materials, roofing, waterproofing, wood, ceramics, adhesive substances, etc. The rapid removal of material is of particular advantage for use in places of business, allowing the material to be completely removed overnight while the place of business is closed or relatively unoccupied.

What is claimed is:

1. A machine for removing a material mounted to an underlying surface from said underlying surface, said machine comprising:

a frame body;

means for propelling said frame body relative to said surface;

a plate carried by said frame body, said plate being movable relative to said frame body between a deployed position for removal of said material from said surface and a stored position with said plate positioned for unrestricted movement of said frame body relative to said surface;

a blade assembly pivotally coupled to said plate, said blade assembly including a removal blade for removing said material from said surface, said blade assembly being movable between a plurality of positions with said blade oriented at an angle relative to said plate; said blade assembly being secured in a selected one of said plurality of positions during removal of said material from said surface, at least one plate actuator mounted to said frame body and said plate for moving said plate between said deployed position and said stored position; and at least one blade actuator mounted to said frame body and said blade assembly for manipulating said blade assembly relative to said plate and securing said blade assembly in a selected one of a plurality of positions relative to said plate.

2. The machine of claim 1 in which said blade actuator is a hydraulic actuator.

3. The machine of claim 1 in which said blade actuator includes at least one cylinder carried by one of said frame body and said blade assembly and at least one ram coupling said cylinder to the other of said frame body and said blade assembly.

4. The machine of claim 3 in which the longitudinal axes of said ram and said cylinder are substantially parallel to said blade.

5. The machine of claim 1, and further comprising at least one control member carried by said frame body, said control member being coupled to said blade actuator for controlling operation of said blade actuator for moving said blade assembly relative to said plate.

6. The machine of claim 1, and further comprising at least one control member carried by said frame body, said control member being coupled to said plate actuator for controlling operation of said plate actuator for moving said plate relative to said frame body.

7. The machine of claim 1 in which said plate actuator includes at least one cylinder carried by one of said frame body and said plate and at least one ram coupling said cylinder to the other of said frame body and said plate.

8. The machine of claim 1 in which said plate actuator is a hydraulic actuator.

9. The machine of claim 1 in which said blade assembly is configured to releasably retain a blade having one of a plurality of sizes and shapes.

10. The machine of claim 1 in which said blade has spaced, first and second edges, said first edge being configured to remove said material from said surface and said second edge mounted to said blade assembly, and in which said blade assembly has an elongated channel defined therein, said elongated channel being shaped to receive said second edge of said blade.

11. The machine of claim 10 in which said blade assembly includes an upper support member and a lower support member positioned to define said elongated channel therebetween, said upper support member and said lower support member being releasably secured together to grip said second edge of said blade and mount said blade to said blade assembly.

12. The machine of claim 1 in which said frame body has a pair of wheels mounted thereto, and in which said means for propelling said frame body includes a hydrostatic motor associated with each of said wheels.

13. The machine of claim 1, and further comprising at least one removable weight carried by said plate, said weight increasing the pressure applied to said blade during the removal of said material from said surface.

14. The machine of claim 1, and further comprising a misting system carried by said frame body for spraying said material with a fluid.

15. A machine adapted to remove a material laid upon an under surface, such machine comprising:

a wheeled and steerable tractor having a front end and a rear end;

a plate mountable to the front end of the tractor, such plate having a proximal end closer to the front end of the tractor and a distal end more remote from the front end of the tractor;

mounting means for mounting said plate to the tractor and permitting movement of the plate between a first position farther removed from a surface and a second position closer to the surface;

a blade assembly mounted on the distal end of the plate for pivotal movement between a plurality of angular orientations relative to said plate, said blade assembly severing a section of material from the material laid upon the under surface and removing the severed section of material from the under surface during operation of said machine; and means for so moving said plate and said blade assembly including at least one blade actuator mounted to said frame body and coupled to said blade assembly for moving said blade assembly relative to said plate.

16. The machine of claim 15 in which said means for so moving said plate and said blade assembly includes at least one plate actuator coupled to said plate for moving said plate relative to said surface.

17. The machine of claim 16 in which said plate actuator includes at least one cylinder carried by one of said tractor and said plate and at least one ram coupling said cylinder to the other of said tractor and said plate.

18. The machine of claim 15 in which said blade actuator includes at least one cylinder carried by one of said frame body and said blade assembly and at least one ram coupling said cylinder to the other of said frame body and said blade assembly.

19. The machine of claim 15 in which said means for so moving said plate and said blade assembly includes at least one control actuable by an operator for controlling movement of said plate relative to said surface and for controlling movement of said blade assembly relative to said plate.

20. A machine for removing a material mounted to an underlying surface from said underlying surface, said machine comprising:

a frame body;

means for propelling said frame body relative to said surface;

a blade assembly carried by said frame body, said blade assembly being movable between a deployed position, for removal of said material from said surface, and a stored position, said blade assembly including a removal blade for removing said material from said surface;

at least one blade actuator mounted to said frame body and said blade assembly for adjusting the position of said blade assembly and securing said blade assembly in a selected position during oration of said machine:

a misting system carried by said frame body for spraying said material with a fluid prior to removal of said material from said surface.

21. The machine of claim 20 in which said misting system includes a nozzle mounted to said frame body and coupled to a fluid source carried by said frame body.

22. The machine of claim 21 in which said nozzle is adjustable between a plurality of positions relative to said frame body.

23. The machine of claim 21 in which said nozzle is removably mounted to said frame body.

24. The machine of claim 20 which further comprises a plate carried by said frame body and at least one plate actuator mounted to said frame body and said plate, said plate being movable relative to said frame body between a deployed position for removal of said material from said surface and a stored position with said plate positioned for unrestricted movement of said frame body relative to said surface upon activation of said plate actuator, and in which said blade assembly is movable between a plurality of positions with said blade oriented at an angle relative to said plate; said blade assembly being secured in a selected one of said plurality of positions during removal of said material from said surface.

* * * * *